C. BOPP.
ADJUSTABLE CASTER.
APPLICATION FILED MAY 27, 1908. RENEWED APR. 16, 1909.

922,381.

Patented May 18, 1909.

WITNESSES
S. M. Gallagher.
E. N. Schofield

INVENTOR
Charles Bopp
BY
W. Truslow Williamson
ATTORNEY

UNITED STATES PATENT OFFICE.

CHARLES BOPP, OF CHARLESTON, SOUTH CAROLINA.

ADJUSTABLE CASTER.

No. 922,381.      Specification of Letters Patent.      Patented May 18, 1909.

Application filed May 27, 1908, Serial No. 435,196. Renewed April 16, 1909. Serial No. 490,420.

*To all whom it may concern:*

Be it known that I, CHARLES BOPP, a citizen of the United States, residing at Charleston, county of Charleston, and State of South Carolina, have invented a certain new and useful Improvement in Adjustable Casters, of which the following is a specification.

My invention relates to a new and useful improvement in adjustable casters, and has for its object to provide an exceedingly simple and effective device of this character by means of which furniture, to the legs of which the casters are applied, may be lifted; a further object of my invention is to so construct a caster that it may be firmly held in any desired adjustment.

With these ends in view, this invention consists in the details of construction and combination of elements hereinafter set forth and then specifically designated by the claims.

In order that those skilled in the art to which this invention appertains may understand how to make and use the same, I will describe its construction in detail, referring by letter to the accompanying drawing forming a part of this specification, in which—

Figure 1:
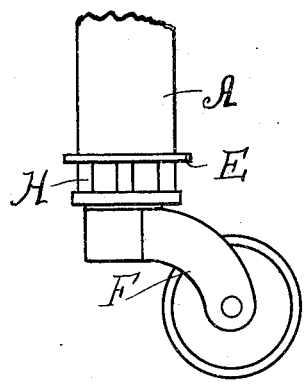
Figure 3:
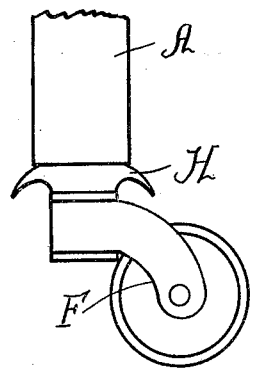
Figure 2:
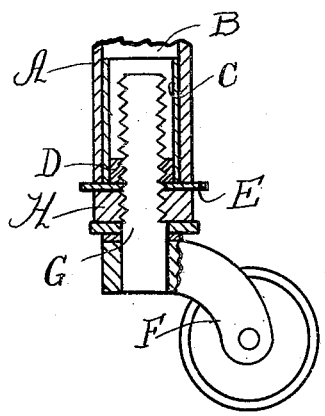

Figure 1 is a side elevation of my improved caster, the leg of furniture to which it is applied being broken away. Fig. 2, a longitudinal section thereof. Fig. 3, a side elevation of a slightly modified form of caster, and Fig. 4, a longitudinal sectional view thereof.

In carrying out my invention as here embodied. A represents the leg of a piece of furniture which has the vertical opening B extending into the leg any desired distance. Into this opening is placed the tube C to the lower end of which is secured the threaded member D which is so formed as to produce the washer portion E which rests against the lower face of the furniture leg A.

F represents a caster having the threaded shank G on which is threaded the lock nut H.

In practice the threaded shank G is screwed into the threaded member D until the desired adjustment is obtained when the set nut H is tightened against the lower face of the washer E which will hold the caster to that adjustment.

Figure 4:
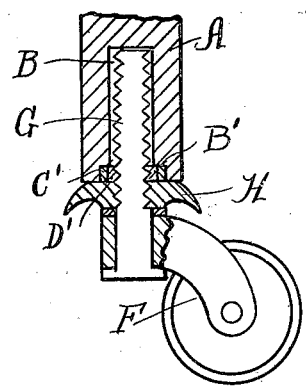

In my modified form as shown in Figs. 3 and 4, I widen the opening B as indicated by B', in this I place a metallic band C' and into this I force the nut D' the sides of which are irregular so as to prevent it from turning. Into this nut D' is then threaded the shank G of the caster until the desired adjustment is obtained when the set nut H will be turned until it rests tightly against the face of the lower portion of the furniture leg, in this way holding the caster to the adjustment obtained.

Of course I do not wish to be limited to the exact details here shown as the tub C, the threaded member D, and the washer portion E might be cast or made of one piece of metal as this would be of great advantage because of a less number of parts to be put together when being manufactured.

Having thus fully described my invention, what I claim as new and useful, is—

1. The herein described combination of a furniture leg having a vertical opening in the lower end thereof, a threaded member having a washer portion formed therewith, said threaded member adapted to be secured within the vertical opening, a caster having a threaded shank, and a nut for holding said caster in any desired adjustment, substantially as and for the purpose set forth.

2. In combination with a furniture leg having a vertical opening in the lower end thereof, a nut, means for securing said nut within the lower portion of said opening, a caster having a threaded shank, said shank adapted to be threaded up and down within said nut, and a lock nut for holding said caster in any adjustment desired.

In testimony whereof, I have hereunto affixed my signature in the presence of two subscribing witnesses.

CHARLES BOPP.

Witnesses:
   WM. J. CRAIG,
   PAUL WIERSE.